(12) United States Patent
Hashimoto et al.

(10) Patent No.: US 9,446,629 B2
(45) Date of Patent: Sep. 20, 2016

(54) PNEUMATIC TIRE

(75) Inventors: Kento Hashimoto, Kodaira (JP); Takeshi Iwatani, Kodaira (JP); Tooru Hayashi, Mitaka (JP)

(73) Assignee: BRIDGESTONE CORPORATION, Tokyo (JP)

( * ) Notice: Subject to any disclaimer, the term of this patent is extended or adjusted under 35 U.S.C. 154(b) by 870 days.

(21) Appl. No.: 13/634,122

(22) PCT Filed: Feb. 28, 2011

(86) PCT No.: PCT/JP2011/001161
§ 371 (c)(1),
(2), (4) Date: Oct. 3, 2012

(87) PCT Pub. No.: WO2011/111331
PCT Pub. Date: Sep. 15, 2011

(65) Prior Publication Data
US 2013/0061991 A1    Mar. 14, 2013

(30) Foreign Application Priority Data

Mar. 12, 2010 (JP) ................................ 2010-056626
Mar. 18, 2010 (JP) ................................ 2010-063351

(51) Int. Cl.
*B60C 11/11* (2006.01)
*B60C 11/03* (2006.01)
*B60C 11/12* (2006.01)

(52) U.S. Cl.
CPC .............. *B60C 11/11* (2013.01); *B60C 11/033* (2013.04); *B60C 11/0304* (2013.04); *B60C 11/0332* (2013.04); *B60C 11/12* (2013.01);

(Continued)

(58) Field of Classification Search
CPC ............... B60C 11/03; B60C 11/0304; B60C 11/0306; B60C 11/0309; B60C 11/033; B60C 11/0332; B60C 11/11; B60C 2011/1213; B60C 11/04
USPC .......... 152/209.8, 209.18, 209.25, 902, 209.1
See application file for complete search history.

(56) References Cited

U.S. PATENT DOCUMENTS

2011/0100520 A1*   5/2011   Shimizu ................... 152/209.18
2011/0162768 A1*   7/2011   Ochi ........................ 152/209.17

FOREIGN PATENT DOCUMENTS

CN        102883893 A       1/2013
EP        0268436    *      5/1988

(Continued)

OTHER PUBLICATIONS

Extended European Search Report issued in European Application No. 11752997.4 dated Oct. 16, 2013.

(Continued)

*Primary Examiner* — Eric Hug
(74) *Attorney, Agent, or Firm* — Sughrue Mion, PLLC

(57) ABSTRACT

A pneumatic tire is disclosed, adapted to highly effectively combine on-ice and on-snow performances. The pneumatic tire includes block groups (G) formed by polygonal blocks (10), which are arranged closely in a tread portion (1). The polygonal blocks (10) are formed by grooves (9) including first groove (9a) with a groove width (W9a) between the polygonal blocks 10 neighboring with each other in the tire circumferential direction. The groove width (W9a) of the first grooves (9a) is larger than a groove width (W9b) of second grooves (9b) between the polygonal blocks 10 neighboring with each other with a zigzag pattern.

4 Claims, 5 Drawing Sheets

(52) U.S. Cl.
CPC  *B60C2011/0381* (2013.04); *B60C 2011/1209* (2013.04); *B60C 2011/1213* (2013.04); *B60C 2011/1227* (2013.04); *B60C 2011/1338* (2013.04)

(56) References Cited

FOREIGN PATENT DOCUMENTS

| EP | 2151334 | * | 2/2010 |
|----|---------|---|--------|
| EP | 2 338 700 A1 | | 6/2011 |
| JP | 8-2215 A | | 1/1996 |
| JP | 8-318710 A | | 12/1996 |
| JP | 10-278509 A | | 10/1998 |
| JP | 2002-192914 A | | 7/2002 |
| JP | 2009-262874 A | | 11/2009 |
| JP | 2010-70105 | * | 4/2010 |
| JP | 2010-95148 | * | 4/2010 |
| JP | 2010-155478 | * | 7/2010 |
| JP | 2010-155519 | * | 7/2010 |
| JP | 2010-184670 | * | 8/2010 |
| JP | 2010-247558 A | | 11/2010 |
| JP | 2011-37392 | * | 2/2011 |
| WO | 2009/157268 A1 | | 12/2009 |
| WO | WO 2009/157268 | * | 12/2009 |
| WO | 2010/032606 A1 | | 3/2010 |
| WO | WO 2010/032606 | * | 3/2010 |

OTHER PUBLICATIONS

Chinese Office Action, dated Jul. 29, 2014, issued in corresponding Chinese Patent Application No. 201180023659.3.
Japanese Office Action, dated Nov. 12, 2013, issued in corresponding Japanese Patent Application No. 2010-056626.
Japanese Office Action, dated Dec. 10, 2013, issued in corresponding Japanese Patent Application No. 2010-063351.
Communication dated Feb. 12, 2015, issued by the State Intellectual Property Office of P.R. China in counterpart Chinese application No. 201180023659.3.
International Search Report for PCT/JP2011-001161 dated Mar. 29, 2011.

* cited by examiner

Section A-A

Section A-A

PNEUMATIC TIRE

CROSS REFERENCE TO RELATED APPLICATIONS

This application is a National Stage of International Application No. PCT/JP2011/001161 filed Feb. 28, 2011, claiming priority based on Japanese Patent Application Nos. 2010-056626 filed Mar. 12, 2010 and 2010-063351 filed Mar. 18, 2010, the contents of all of which are incorporated herein by reference in their entirety.

TECHNICAL FIELD

The present invention relates to a pneumatic tire comprising a number of blocks formed by grooves in a tread portion so as to improve on-ice performance simultaneously with a variety of other performances. More specifically, the present invention relates to a pneumatic tire having an optimized arrangement of blocks for increasing the pattern edges while maintaining the block rigidity, to thereby highly effectively combine both on-ice and on-snow performances, and also to a pneumatic tire having a tread portion provided with blocks formed by first grooves extending in the tire width direction and second grooves extending in the tire circumferential direction and crossing with the first grooves, for significantly improving the on-ice performance while enhancing the quietness of the tire.

BACKGROUND ART

Conventionally, a block pattern in a tread portion has been the mainstream as the tread pattern for winter pneumatic tires, wherein the on-snow performance is improved through snow pillar shearing force etc. caused by the grooves between each block, while the on-ice performance is enhanced by sipes in the tread of each block (refer, for example, to Patent Document 1: JP 2002-192914A).

DISCLOSURE OF THE INVENTION

Problems to be Solved by the Invention

In order to improve the on-ice performance in the pneumatic tire as described above, it is effective to decrease the negative ratio for increasing ground-contact area upon rolling of a loaded tire. On the other hand, in order to improve the on-snow performance, it is beneficial to increase the groove area, thus increasing negative ratio. This means that the on-ice performance and the on-snow performance are inconsistent with each other, and it has been thus difficult to improve the on-ice performance without substantially degrading the on-snow performance. In addition, as measures for improving the on-snow performance, it is effective to increase the number of sipes so as to increase the edge element within the tread pattern. However, an excessive number of sipes tends to lower the block rigidity and reduce the ground-contact area due to the bending deformation of the blocks, thereby degrading the on-ice performance even further.

Therefore, it is an object of the present invention to solve the above mentioned problems and provide a pneumatic tire adapted to highly effectively combine both the on-ice and on-snow performances by optimizing the arrangement of the blocks.

Another object of the present invention is as follows; namely as mentioned above, the effects for removing water screen and scratching water surface can be improved by increasing sipes, on the other hand, too many sipes will decrease block rigidity, thus increasing buckling of the blocks and reducing the ground-contact area. On the contrary, on-ice performance will be deteriorated by reducing the ground-contact area as described.

In view of the above, the applicant proposed in Japanese Patent Application No. 2008-236342 (corresponding to Patent Document 2: WO 2010/032606A) to arrange relatively small-sized blocks in a mutual dense arrangement, so as to prevent the blocks from buckling and decreasing in ground-contact area while increasing the edges formed by the peripheral borders of the blocks. Such a proposal proved to successfully improve the on-ice performance significantly in comparison with the prior art.

Following the enhanced quietness of the vehicles in recent years, there is a demand for an improved quietness of the tire as well. With respect to the tire comprising such small blocks in a dense arrangement, a so-called "pitch variation" was adopted in consideration of the improved quietness of the tire. The result was that the block rigidity and the edge amount fluctuated in the tire circumferential direction, thereby giving rise to a problem that the on-ice performance may not be realized as desired.

Therefore, it is another object of the present invention to provide a pneumatic tire improving the on-ice performance significantly, while enhancing the quietness of the tire.

Means for Solving the Problems

A first embodiment of the present invention resides in a pneumatic tire that comprises a plurality of polygonal blocks formed by grooves in a tread of polygons and having no less than five sides in a tread portion. Two or more polygonal block rows are provided in the tread portion by arranging the polygonal blocks at intervals in a tire circumferential direction and the polygonal blocks in the polygonal block rows neighboring with each other in a tire width direction are arranged with a zigzag pattern, so that the polygonal block of one polygonal block row is positioned between the polygonal blocks of the other polygonal block row in the tire circumferential direction. The polygonal blocks of one and the other polygonal block rows overlap partly as seen from both the tire circumferential and width directions, thereby forming the block groups by arranging the polygonal blocks closely in the tread portion. The polygonal blocks are formed by grooves, including first grooves between the polygonal blocks neighboring with each other in the tire circumferential direction, and second grooves between the polygonal blocks neighboring with each other with a zigzag pattern, wherein the first grooves are larger in width than second grooves.

In such a pneumatic tire, two or more polygonal block rows are provided in the tread portion by arranging the polygonal blocks at intervals in the tire circumferential direction, and the polygonal blocks in the polygonal block rows neighboring with each other in the tire width direction are arranged with a zigzag pattern, in which the polygonal block of one polygonal block row is positioned between the polygonal blocks of the other polygonal block row in the tire circumferential direction, and the polygonal blocks of one and the other polygonal block rows overlap partly as seen from both the tire circumferential and width directions, thereby forming the block groups by arranging the polygonal blocks closely in the tread portion. Thus, optimized block rigidity can be secured to increase the ground-contact property, and the pattern edges are also increased for realizing an excellent on-ice performance.

Furthermore, the polygonal blocks are formed by the grooves, including the first grooves between the polygonal blocks neighboring with each other in the tire circumferential direction, and the second grooves between the polygonal blocks neighboring with each other with a zigzag pattern, wherein the first grooves are larger in width than the second grooves. Thus, the sufficient snow pillar shearing force can be brought out for realizing the superior on-snow performance.

With the first embodiment of the pneumatic tire of the present invention, it is possible to combine the on-ice and on-snow performances highly effectively, by optimizing the arrangement of the polygonal blocks.

In the pneumatic tire according to the first embodiment, it is preferred that the block group has a block density, a number of the polygonal blocks per unit area of actual ground-contact, within a range of 0.003 to 0.04 (pieces/mm$^2$). Here, the term "unit area of ground-contact" is applicable under a tire ground-contact condition wherein the pneumatic tire is installed to a standard rim defined according to the "JATMA YEAR BOOK" (Japan Automobile Tire Manufactures Association), inflated by 100% inner pressure of the air pressure (the maximum air pressure) corresponding to the maximum load capacity (the inner pressure-the load shown in bold at Load Capacity Table) for the applicable size and ply ratings according to "JATMA YEAR BOOK" and applied by the maximum load. In case TRA Standards or ETRTO Standards are applied in geographical regions of use or production, it is necessary to follow the relevant standards accordingly.

Additionally, in the pneumatic tire according to the first embodiment, among the grooves forming the polygonal blocks in the polygonal block groups, it is preferred that the first grooves between the polygonal blocks neighboring with each other in the tire circumferential direction have a groove width within a range of 2.5 to 10.0 mm, and the second grooves between the polygonal blocks with a zigzag pattern have a groove width within a range of 0.4 to 3.0 mm.

Moreover in the pneumatic tire according to the first embodiment, it is preferred that the tread portion is provided with the circumferential grooves extending in the tire circumferential direction, and the grooves forming the polygonal blocks in the polygonal block groups are smaller in depth than the circumferential grooves.

In addition, in the pneumatic tire according to the first embodiment, it is preferred that the polygonal blocks in the polygonal block groups have a ground-contact area within a range of 50~250 mm$^2$. Here, the term "ground-contact area" is applicable under the tire ground-contact condition that the pneumatic tire is installed to a standard rim defined according to the "JATMA YEAR BOOK", inflated by 100% inner pressure of the air pressure (the maximum air pressure) corresponding to the maximum load capacity (the inner pressure-the load shown in bold at Load Capacity Table) for the applicable size and ply ratings according to "JATMA YEAR BOOK" and applied by the maximum load.

A second embodiment of the present invention resides in a pneumatic that comprises polygonal blocks formed by first grooves extending in a tire width direction, and second grooves extending in a tire circumferential direction. The polygonal blocks in the tread portion are of polygonal shape having no less than five sides, wherein the polygonal block rows are provided by arranging the polygonal blocks closely in the tire circumferential direction. At least two types of pitches having different pitch lengths are arranged in the polygonal blocks forming the polygonal block rows, wherein the ratio between the maximum and minimum pitch lengths is within a range of 1:0.8 to 0.9. Here, the term "extending in the tire circumferential direction" means not only extending linearly along the tire circumferential direction but also extending while curving and twisting in the tire circumferential direction as a whole second groove.

In such a pneumatic tire, the polygonal blocks forming the polygonal block rows are arranged closely in the tread of polygons with no less than five sides, thus the optimized block rigidity is secured and the edges formed by the peripheral borders of the polygonal blocks are increased. Therefore the excellent on-ice performance can be realized by preventing the blocks from buckling and decreasing in ground-contact area and increasing the pattern edges.

Since at lease two types of pitches having different pitch lengths are arranged in the polygonal blocks forming the polygonal block rows, and the maximum and minimum pitch length ratio is within a range of 1:0.8 to 0.9, it is possible to reduce both fluctuation of the block rigidity and the edge amount in the tire circumferential direction to such a small degree that does not affect the on-ice performance.

Consequently, according to the pneumatic tire of the second embodiment having the optimized size of each polygonal block and also the optimized pitch length of the polygonal blocks, it is possible to improve the on-ice performance significantly while further reducing the noise, in comparison with the prior art.

Also, in the pneumatic tire according to the second embodiment, in case that collection of polygonal blocks included in at lease one polygonal block row is regarded as a polygonal block group, it is preferred that the block group has a block density, a number of the polygonal blocks per unit area of actual ground-contact, within a range of 0.003 to 0.04 (pieces/mm$^2$). Here, the term "unit area of ground-contact" is applicable under a tire ground-contact condition wherein the pneumatic tire is installed to a standard rim defined according to the "JATMA YEAR BOOK" (Japan Automobile Tire Manufactures Association), inflated by 100% inner pressure of the air pressure (the maximum air pressure) corresponding to the maximum load capacity (the inner pressure-the load shown in bold at Load Capacity Table) for the applicable size and ply ratings according to "JATMA YEAR BOOK" and applied by the maximum load. In case TRA Standards or ETRTO Standards are applied in geographical regions of use or production, it is necessary to follow the relevant standards accordingly.

In addition, in the pneumatic tire according to the second embodiment, it is preferred that each polygonal block forming the polygonal block rows has a ground contact area within a range of 50~250 mm$^2$.

Additionally, in the pneumatic tire according to the second embodiment, it is preferred that the tread portion is provided with circumferential grooves extending in the tire circumferential direction, and the circumferential grooves are larger in depth than the first and second grooves, both forming the polygonal block groups.

Effects of the Invention

The present invention makes it possible to improve the on-ice performance simultaneously with a variety of other performances. Namely, according to the first embodiment of the pneumatic tire of the present invention can be provided combining both the on-ice and on-snow performances highly effectively, and also according to the second embodiment of the present invention, it is possible to improve the on-ice performance further while to improve the quietness of the tire than before.

BRIEF DESCRIPTION OF THE DRAWINGS

FIGS. 5(a) and 5(b) are enlarged views illustrating only the polygonal block rows shown in FIG. 4, wherein FIG. 5(a) shows the case in which the circumferential lengths of the first grooves are changed respectively to realize the pitch variation, and FIG. 5(b) shows the case in which the circumferential lengths of the polygonal blocks are changed respectively to realize the pitch variation.

BEST MODE FOR CARRYING OUT THE INVENTION

Figure 1:
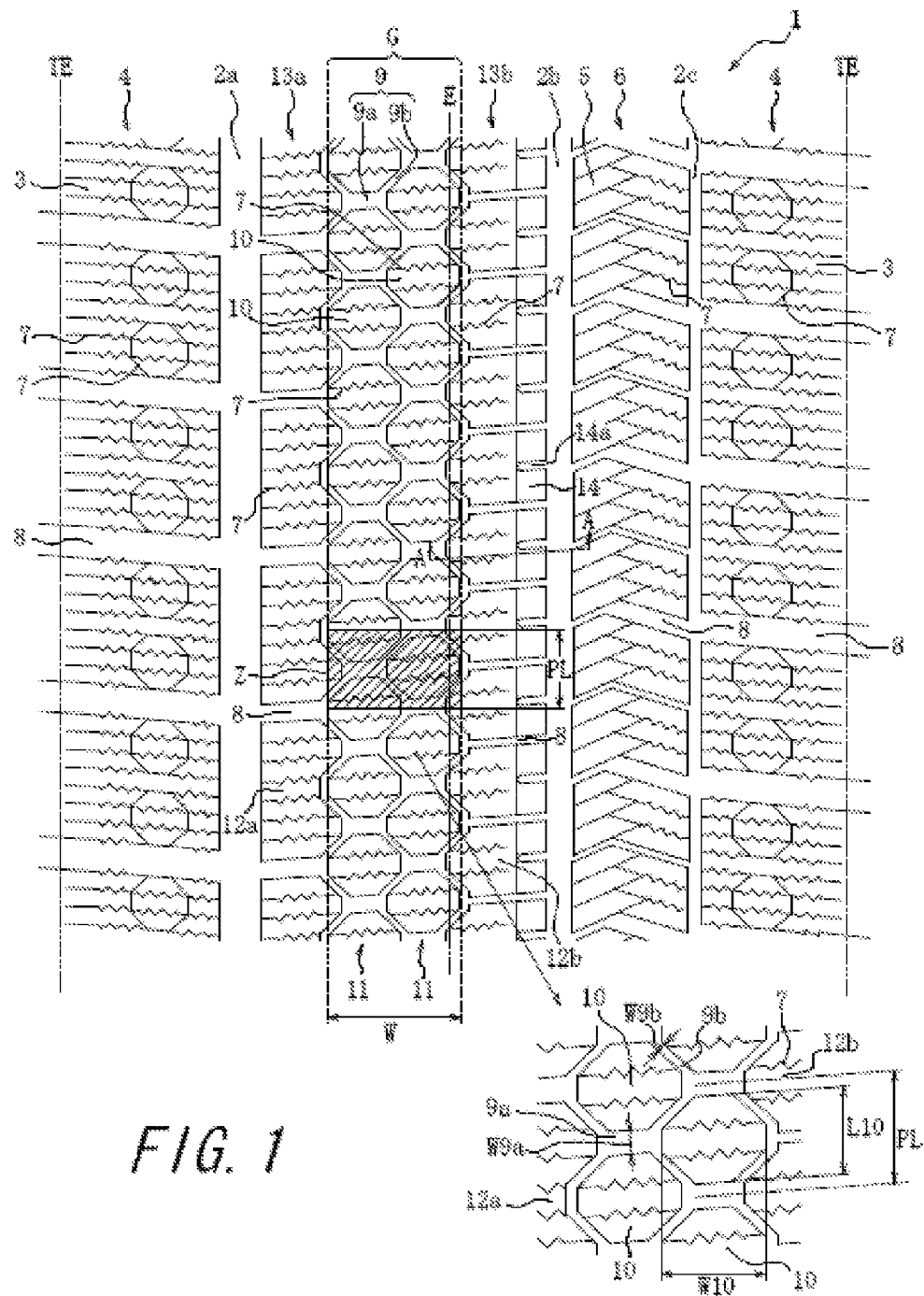
FIG. 1 is an exploded view showing the tread pattern of the pneumatic tire (Embodiment Tire 1) according to the first embodiment of the present invention.

The present invention will be further described with reference to preferred embodiments shown in the accompanying drawings. FIG. 1 is an exploded view showing the tread pattern of the pneumatic tire as the first embodiment of the present invention. In FIG. 1, E indicates a tire equatorial plane and TE indicates ground-contact edges of the tread.

In a customary manner, the pneumatic tire is comprised of a pair of bead portions, a pair of side wall portions, a tread portion and a carcass reinforcing these portions between bead cores buried in each bead portion, which are not shown in the drawings. Carcass codes can be arranged either as radial-ply or bias-ply. In the case of a radial-ply arrangement, a belt reinforcing the tread portion shall be equipped in a carcass outer circumference.

In the tread portion 1 of FIG. 1, at least one circumferential groove is formed, e.g., three circumferential grooves 2a, 2b and 2c as shown in the drawing. Outside the circumferential grooves 2a and 2c in a tire width direction, shoulder block rows 4 are provided by arranging shoulder blocks 3 across the ground-contact edges of the tread in the tire width direction. Between the circumferential grooves 2b and 2c, rectangular block rows 6 are provided by arranging a number of rectangular blocks 5 extending tire-widthwise in a tire circumferential direction. Sipes 7 are formed in each shoulder block 3 and rectangular block 5 depending upon the rigidity of each block. In addition, between the shoulder blocks 3 and the rectangular blocks 5, both neighboring with each other in the tire circumferential direction, lug grooves 8 extending in the tire width direction are formed.

Between the circumferential groove 2a and 2b, a number of polygonal blocks 10 are provided, formed by grooves 9 in the tread and having a polygonal contour shape with no less than five sides. It is preferred that the contour shape is an octagon. However, the contour shape is not limited to octagon, and may be other polygonal forms such as pentagon or hexagon. By applying an octagon, it is possible to secure edges extending in the tire width direction and also to arrange the polygonal blocks 10 closely with a zigzag pattern, which will be more fully described hereinafter. Each polygonal block 10 is comprised of two sipes 7 depending upon the block rigidity, however the sipes may be omitted.

Two or more polygonal block rows are provided in the tread portion 1 by arranging the polygonal blocks 10 at intervals in the tire circumferential direction. For instance, two polygonal block rows 11 are formed in the tire circumferential direction in the drawing. The polygonal blocks 10 in the polygonal block rows 11 neighboring with each other in the tire width direction are arranged with a zigzag pattern, in which the polygonal block 10 in one polygonal block row 11 is positioned between the polygonal blocks 10 of the other polygonal block row 11, and the polygonal blocks 10 of one and the other polygonal block rows 11 overlap partly as seen from both the tire circumferential and width directions, thereby forming block groups G by arranging the polygonal blocks 10 closely in the tread portion 1.

Here, in the block groups G, the grooves 9 forming the polygonal blocks 10 are comprised of groove portions 9a (hereinafter referred to as the "first grooves") between the polygonal blocks 10 neighboring with each other in the tire circumferential direction, and groove portions 9b (hereinafter referred to as the "second grooves") between the polygonal blocks 10 arranged with a zigzag pattern.

In the block groups G, the grooves 9 (including the first grooves 9a and the second grooves 9b) forming the polygonal blocks 10 are smaller in depth than the circumferential grooves 2a, 2b and 2c. And, groove widths W9a of the first grooves 9a of the grooves 9 are larger than groove widths W9b of the second grooves 9b. The both groove widths W9a and W9b of the first and second grooves 9a and 9b of the grooves 9 are defined to be so wide that the first and second grooves 9a and 9b will not be closed on the ground-contact surface under the tire ground-contact condition that the pneumatic tire is installed to a standard rim defined according to the "JATMA Year Book", inflated by 100% inner pressure of the air pressure (the maximum air pressure) corresponding to the maximum load capacity (the inner pressure-the load shown in bold at Load Capacity Table) for the applicable size and ply ratings according to "JATMA Year Book" and applied by the maximum load. More specifically, it is preferred that the groove width W9a of the first grooves 9a is within a range of 2.5 to 10.0 mm and the groove width W9b of the second grooves 9b within a range of 0.4 to 3.0 mm. If the groove width W9a is less than 2.5 mm, enough amount of snow cannot be taken in the first grooves 9a so that the on-snow performance may not be realized fully due to the decreased snow pillar shearing force. On the other hand, if the groove width W9a exceeds 10.0 mm, the number of the polygonal blocks 10 formed in the tire circumferential direction is decreased so that the on-ice performance may not be realized fully due to the decreased edge element formed by the polygonal blocks 10. Also, if the groove width W9b is less than 0.4 mm, the second grooves 9b tends to be closed upon rolling of a loaded tire, thus decreasing on-ice and on-snow performances. On the other hand, if the groove width W9b exceeds 3.0 mm, the block groups G cannot be arranged so closely that the block rigidity may deteriorate, also the ground-contact property getting worse accordingly.

In the pneumatic tire according to the first embodiment, the block groups G have a block density D per unit area of actual ground-contact, as represented by the number "a" of the polygonal blocks 10 within a reference area Z (the hatched section in FIG. 1), which is virtually defined by a reference pitch length PL (mm) of the polygonal block 10 in a given polygonal block row 11 within the block group G, and a width W (mm) of the block group G, wherein the block density D is expressed as:

$$D = \frac{a}{PL \times W \times (1 - N/100)}$$

where N (%) is a negative ratio within the reference area, and wherein the block density D is within a range of 0.003 to 0.04 pieces/mm². Here, the width W is a distance measured along the block group G in the tire width direction, and the block density D defines how many polygonal blocks 10 are provided per unit actual ground-contact area of each block group G (excluding the grooves areas). Incidentally, the block density D of a usual winter tire (studless tire) is approximately 0.002 or less. When counting the number "a" of polygonal blocks 10 within the reference area Z, there is a case that a certain polygonal block 10 is placed astride both inside and outside the reference area Z and cannot be counted as one block. This type of polygonal block 10 is counted based on the proportion of its remaining area within the reference area Z to its total area. For instance, the polygonal block 10 positioned astride inside and outside the reference area Z has only the half area within the reference area Z, so that it is counted as ½ piece.

If the block density D of each block group G is less than 0.003 (pieces/mm²), the polygonal blocks 10 are enlarged in size, thus it is likely that the pattern edges are lacking. On the other hand, if the block density D exceeds 0.04 (pieces/mm²), the polygonal blocks 10 are too small in size, thus it is likely that the block rigidity decreases, leading to deterioration of both the ground-contact property and the on-ice performance. Finally, with the block density D within a range of 0.0035 to 0.03 (pieces/mm²), a pneumatic tire is adapted to highly effectively combine the secured block rigidity and the increased pattern edges.

It is preferred that the negative ratio N (%) within the block group G is within a range of 5% to 50%. If the negative ratio N (%) is less than 5%, the groove volume becomes too small to realize the sufficient drainage performance, and at the same time the polygonal block 10 becomes too large in size to increase the pattern edges. On the other hand, if the negative ratio N exceeds 50%, the block rigidity is decreased due to the small ground-contact area.

Moreover, it is preferred that the ground-contact area of the polygonal blocks 10 in the block groups G is within a range of 50 to 250 mm² so as to keep the rather small polygonal blocks 10, thus realizing the optimized block rigidity and securing the good-gripping force. By means of the range of 50 to 250 mm², the distance from the central area to peripheral areas on the tread of the polygonal blocks 10 becomes shortened so that the existing water film can be removed effectively from the road surface as the polygonal blocks 10 comes into contact with the ground. In addition, if the ground-contact area of the polygonal blocks 10 is less than 50 mm², the block rigidity is insufficient, thereby causing buckling of the polygonal blocks 10 due to lack of the block rigidity upon contact with the ground, which is undesired. On the other hand, if the ground-contact area exceeds 250 mm², the polygonal blocks 10 become too large in size to increase the pattern edges, which is undesired, either.

Figure 2:
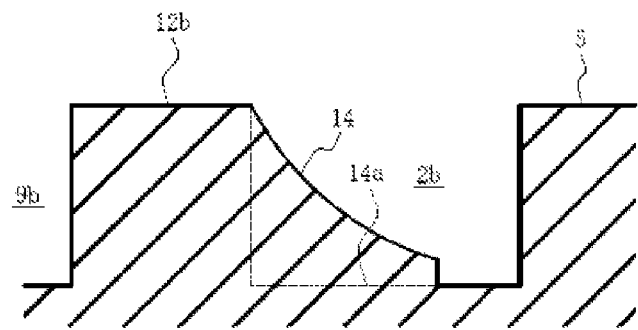
FIG. 2 is a sectional view taken along line A-A in FIG. 1.

In the first embodiment of the present invention, in the outside of the block groups G comprising two polygonal block rows 11 in the tire width direction, side block rows 13a and 13b are formed by arranging a number of side blocks 12a and 12b in the tire circumferential direction for surrounding the block groups G. Instead of the side block 12a and 12b, it is also possible to arrange the above mentioned polygonal blocks 10, therefore forming four or more polygonal block rows 11. Here, the side blocks 12a and 12b in the side block rows 13a and 13b are larger in length in the tire circumferential direction than the polygonal blocks 10 in the block groups G. Also, the side blocks 12a (the left side block row 13a in FIG. 1) in one of two side block rows 13a and 13b are larger in length in the tire circumferential direction than the side blocks 12b in the other side block row 13b (the right side block row in FIG. 1). In a similar manner to other blocks, two to six rows of sipes 7 are formed in each side block 12a and 12b depending on the block rigidity, and the lug grooves 8 are formed between the side blocks 12a and 12b neighboring with each other in the tire circumferential direction. As shown in FIG. 2, the circumferential groove 2b is comprised of a raised bottom portion 14 to reduce the groove depth partly and connect with the side block 12b. Within the raised bottom portion 14, a pocket (groove) 14a is formed extending substantially in the tire width direction.

The effects of the first embodiment of the present invention will be described below. In the tread portion 1, two or more polygonal block rows 11 are formed by arranging the polygonal blocks 10 at intervals in the tire circumferential direction. And also, the polygonal blocks 10 in the polygonal block rows 11 neighboring with each other in the tire width direction are arranged with a zigzag pattern, in which the polygonal block 10 of one polygonal block row 11 is positioned between the polygonal blocks 10 of the other polygonal block row 11, and the polygonal blocks 10 of one and the other polygonal block rows 11 overlap partly as seen from both the tire circumferential and width directions, thereby forming the block groups G by arranging the polygonal blocks 10 closely. In the pneumatic tire comprising the block groups G as described above, an adequate block rigidity is secured, thus the ground-contact property of the polygonal blocks 10 can be improved. As each polygonal block 10 is downsized and arranged sufficiently closely so that it is also possible to secure the block rigidity while increase the pattern edges (the total edge length of all polygonal blocks 10) significantly, thereby improving the on-ice performance conspicuously.

Among the grooves 9 forming the polygonal blocks 10, the groove widths W9a of the first grooves (transverse grooves) 9a between the polygonal blocks 10 neighboring with each other in the tire circumferential direction are larger in width than the groove widths W9b of the second grooves (longitudinal grooves) 9b between the polygonal blocks 10 with a zigzag pattern, which enables the first grooves 9a between the polygonal blocks 10 neighboring with each other in the tire circumferential direction to bring out the sufficient snow pillar shearing force, therefore an excellent on-snow performance can be realized.

Thus, according to the pneumatic tire as above mentioned, the on-ice and on-snow performances can be combined highly effectively by means of the optimized block arrangement.

Also, in the first embodiment, the grooves 9 forming the polygonal blocks 10 in the block groups G (i.e., the first and second grooves 9a and 9b) are smaller in depth than the circumferential grooves 2a, 2b and 2c, thereby securing good drainage performance and hydroplaning resistance in the circumferential grooves 2a, 2b and 2c, while increasing the rigidity of the polygonal blocks 10 for good ground-contact property, so as to increase the on-ice performance even further. It is also possible that only the second grooves 9b are smaller in depth than the circumferential grooves 2a, 2b and 2c, thus enabling the first grooves 9a to take in enough amount of snow and increase the snow pillar shearing force.

Moreover, in the first embodiment, the circumferential groove 2b is comprised of the raised bottom portion 14, and the pocket 14a is formed therein extending substantially in the tire width direction, thus enhancing the coexistence of the on-ice and on-snow performances even further.

Figure 4:
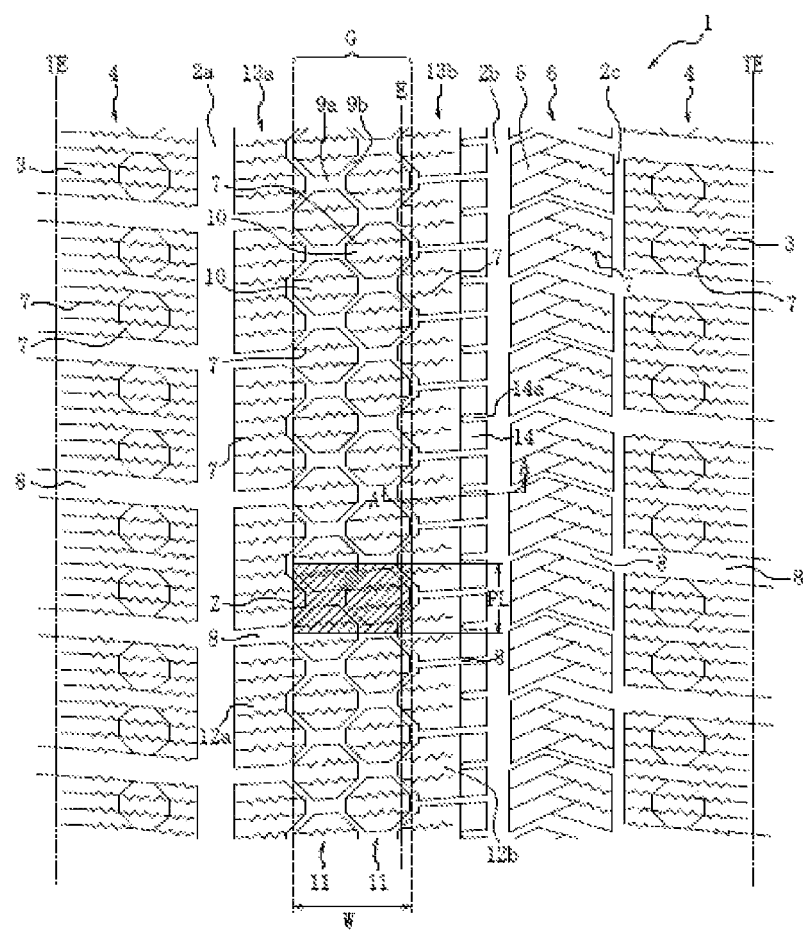
FIG. 4 is an exploded view showing the tread pattern of the pneumatic tire according to the second embodiment of the present invention.

A second embodiment of the present invention will be described below with reference to FIG. 4, which is an exploded view showing the tread pattern of the pneumatic tire. In FIG. 4, E indicates the tire equatorial plane and TE indicates the ground-contact edges of the tread.

In a customary manner, the pneumatic tire is comprised of a pair of bead portions, a pair of side wall portions, a tread portion and a carcass reinforcing these portions between bead cores buried in each bead portion, which are not shown in the drawings. Carcass codes may be arranged either as a radial-ply or bias-ply. In the case of a radial-ply arrangement, a belt reinforcing the tread portion is provided in the carcass outer circumference.

In the tread portion 1 shown in FIG. 4, at least one circumferential groove is formed, and three circumferential grooves 2a, 2b and 2c are formed in the drawing. Outside the circumferential grooves 2a and 2c in a tire width direction, shoulder block rows 4 are provided by arranging shoulder blocks 3 across the ground-contact edges of the tread in the tire width direction. Between the circumferential grooves 2b and 2c, rectangular block rows 6 are provided by arranging a number of rectangular blocks 5 in a tire circumferential direction, which blocks are elongate in the tire width direction. Sipes 7 are formed in each shoulder block 3 and rectangular block 5 depending on the rigidity of each block. In addition, between the shoulder blocks 3 and the rectangular blocks 5, both neighboring with each other in the tire circumferential direction, lug grooves 8 are formed to extend in the tire width direction.

Between the circumferential groove 2a and 2b, a number of the polygonal blocks 10 are provided, formed by first grooves extending in the tire width direction and the second grooves extending in the tire circumferential direction, crossing each other, in the tread of polygons with no less than five sides. As shown in FIG. 4, the polygonal blocks 10 having the tread in an octagonal form (octagonal blocks) are provided. It is preferred for the polygonal blocks to have an octagonal contour shape, though the contour shape is not limited to an octagon and may be other polygonal shape such as pentagon or hexagon. By applying an octagonal contour shape, it is possible to secure edges extending in the tire width direction and also to arrange the polygonal blocks 10 closely with a zigzag pattern, which will be more fully described hereinafter. Each polygonal block 10 is comprised of two sipes 7 depending on the block rigidity, though the sipes may be omitted.

The polygonal blocks 10 are densely arranged at predetermined intervals in the tire circumferential direction, so as to form at least one polygonal block row 11 in the tread portion. For instance, two polygonal block rows 11 are formed in the drawing. The polygonal blocks 10 in the polygonal block rows 11 neighboring with each other in the tire width direction are arranged with a zigzag pattern, so that the polygonal block 10 of one polygonal block row 11 is positioned between the polygonal blocks 10 of the other polygonal block row 11, and the polygonal blocks 10 of one and the other polygonal block rows 11 overlap partly as seen from both the tire circumferential and width directions.

Figure 5:
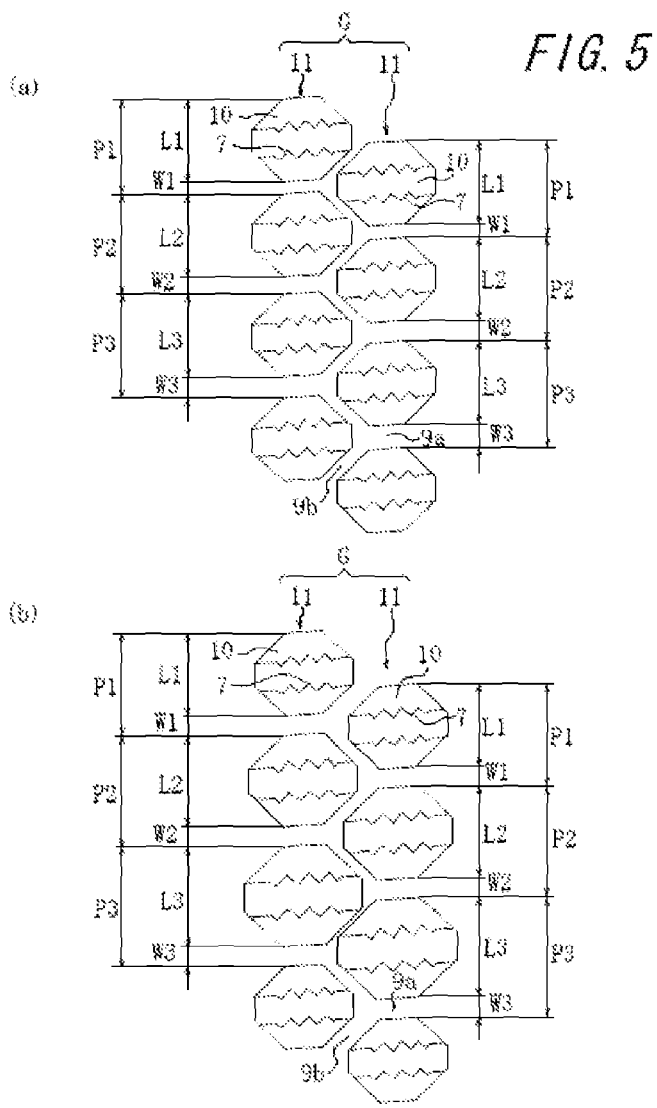

As shown in FIGS. 5(a) and 5(b), at least two types of pitches having different pitch lengths are arranged. In the embodiment of FIG. 5, three types of pitches having different pitch lengths P1, P2 and P3 are formed. Namely, each polygonal block 10 in the polygonal block row 11 and each one of first grooves 9a adjacent to the polygonal block 10 are arranged in two or more different pitch lengths P1, P2 and P3. Here, the relationship of each pitch length P1, P2 and P3 is;

$$P1<P2<P3$$

However, the relationship is not limited to the above, and the followings are also possible;

$$P2<P1<P3 \text{ or } P1>P2>P3$$

Though now shown in the drawings, four or more different pitch types having different lengths can also be formed.

As shown in FIG. 5(b), in order to change each pitch length P1 to P3, the circumferential lengths L1 to L3 of the polygonal blocks 10 remain nearly equal, while the circumferential length W1 to W3 of one of the first grooves 9a adjacent to the polygonal blocks 10 can vary such that W1<W2<W3. Also as shown in FIG. 5(b), the circumferential length L1 to L3 of the polygonal blocks can vary such that L1<L2<L3, while the circumferential lengths W1 to W3 of one of the first grooves 9a adjacent to the polygonal blocks 10 remain nearly equal. By the former pattern, the rigidity of each polygonal block 10 remains nearly the same in the tire circumferential direction, thus realizing the form suitable for the on-ice performance in particular. By the latter pattern, the groove volume of the first grooves 9a can be secured at a certain level so that the sufficient snow pillar shearing force is obtained as the form suitable for the on-snow performance especially.

Although not shown in the drawing, the desired pitch variation can be also realized by the following arrangement. Namely, the circumferential lengths of the polygonal blocks 10 are changed such that:

$$L1<L2<L3 \text{ or } L2<L1<L3 \text{ or } L3<L1<L2$$

while the circumferential lengths of the first grooves 9a are changed such that:

$$W1<W2<W3 \text{ or } W2<W1<W3 \text{ or } W3<W1<W2$$

This means that a small polygonal block 10 is accompanied by also a small circumferential length of the first groove 9a adjacent to the polygonal block 10, and a large polygonal block 10 is accompanied by a large circumferential length of the first groove 9a adjacent to the polygonal block 10 so as to realize the desired pitch variation, while changing just slightly the sizes of the polygonal block 10 in the tire circumferential direction. The arrangement as descried above is preferred to equalize the rigidity of the polygonal blocks 10 in the tire circumferential direction, which will be described hereinafter.

Furthermore, in the second embodiment as shown, the total block sizes are changed so as to alter the circumferential lengths of the polygonal blocks 10. However, it is also possible to keep the fixed lengths of the polygonal blocks 10 in the tire width direction and to alter only the circumferential lengths (not shown in the drawings). The arrangement described just above prevents the block rigidity in the tire width direction from changing in the tire circumferential direction, thereby securing an excellent driving stability.

Also, in each polygonal block row, the following relation can be derived between the maximum pitch length $P_{max}$ (here P3) and the minimum pitch length $P_{min}$ (here P1):

$P_{max}:P_{min}=1:0.8$ to 0.9, more preferably $P_{max}:P_{min}=1:0.85$
If the ratio "$P_{min}/P_{max}$" is less than 0.8, the differences in the block rigidity and the edge amount between the maximum and minimum polygonal blocks become large and also the edge arrangement in the tire circumferential direction becomes uneven, which reduces the on-ice performance enhancing effect to be realized by the dense arrangement of the small polygonal blocks. On the other hand, if the ratio "$P_{min}/P_{max}$" exceeds 0.9, the white noising effect by the pitch variation is reduced. Also as shown in FIG. 5(b), in realizing the pitch variation by changing the sizes of the polygonal blocks 10, it is preferred that the following ratio is realized between the maximum and minimum polygonal blocks 10 in the same polygonal block row 11, in terms of a tread area of the polygonal blocks 10, in order to equalize the polygonal block rigidity in the tire circumferential direction and improve the on-ice performance;

$P_{max}:P_{min}=1:0.8$ to 0.9

In order to improve the on-ice performance by the dense arrangement of the polygonal blocks 10, the block groups G, the groups of the polygonal blocks 10 in at least one polygonal block row 11 (e.g., two rows as shown in the drawings), have preferably a block density D, which is the number of the polygonal blocks 10 per unit area of actual ground-contact, and which is within a range of 0.003 to 0.04 (pieces/mm²).

The block groups G have a block density D per unit area of actual ground-contact, as represented by the number "a" of the polygonal blocks 10 within a reference area Z (the hatched section in FIG. 4). The reference area is virtually defined by a given reference pitch length PL (here one of pitch lengths P1 to P3) (mm) of the polygonal blocks 10 in a given polygonal block row 11 within the block groups G, and a width W (mm) of the block groups G, wherein the block density D is expressed as:

$$D = \frac{a}{PL \times W \times (1 - N/100)}$$

where N (%) is a negative ratio within the reference area. The width W is the distance from one end to the other end of the polygonal block group G in the tire width direction, and the block density D defines how many polygonal blocks 10 are provided per unit actual ground-contact area of the polygonal block group G. Incidentally, the block density D of a usual winter tire (studless tire) is approximately 0.002 or less. When counting the number "a" of polygonal blocks 10 within the reference area Z, there is a case that a certain polygonal block 10 is placed astride both inside and outside the reference area Z and cannot be counted as one block. This type of polygonal block 10 is counted based on the proportion of its remaining area within the reference area Z to its total area. For instance, the polygonal block 10 placed astride inside and outside the reference area Z keeps only the half area within the reference area Z, it is counted as ½ piece.

If the block density D of the block group G is less than 0.003 (pieces/mm²), the polygonal blocks 10 become too large to increase the pattern edges by the dense arrangement of the polygonal blocks 10. On the other hand, if the block density D exceeds 0.04 (pieces/mm²), the polygonal blocks 10 are too small in size, thus it is likely that the block rigidity will decrease, leading to the buckling of the polygonal blocks 10, thereby reducing the ground-contact area and deteriorating the on-ice performance. Finally, with the block density D within a range of 0.0035 to 0.03 (pieces/mm²), a pneumatic tire is adapted to highly effectively combine the secured block rigidity and the increased pattern edges.

It is preferred that the negative ratio N (%) within the block group G is within a range of 5% to 50%. If the negative ratio N (%) is less than 5%, the groove volume becomes too small to realize the sufficient drainage performance, and at the same time the polygonal block 10 becomes too large in size to increase the pattern edges. On the other had, if the negative ratio N exceeds 50%, the ground-contact area becomes too small. Therefore, in each case, it is likely that the sufficient on-ice performance cannot be secured.

Moreover, it is preferred that the ground-contact area of the polygonal blocks 10 forming the polygonal block rows 11 is within a range of 50 to 250 mm² so as to keep the rather small polygonal blocks 10, thus realizing the optimized block rigidity and securing the good-gripping force. Also by means of the range of 50 to 250 mm², the distance from the central to peripheral areas on the tread of the polygonal blocks 10 is shortened so that the existing water film can be removed effectively from the road surface upon the polygonal blocks 10's contact with the ground. In addition, if the ground-contact area of the polygonal blocks 10 is less than 50 mm², the ratio between a ground-contact area and a height of the polygonal blocks 10 decreases, thus reducing the block bending rigidity. Thus, buckling of the polygonal blocks 10 is caused thus deforming easily upon contact with the ground, which might deteriorate the handling performance on various road surfaces such as dry, wet, icy and snowy roads. On the other hand, if the ground-contact area of the polygonal blocks 10 exceeds 250 mm², it is difficult to increase the pattern edges by the dense arrangement of the polygonal blocks 10. When each polygonal block 10 is enlarged, the drainage resistance is increased by the polygonal blocks in running on the wet road surface, and it is likely that the hydroplaning performance will deteriorate.

Figure 6:
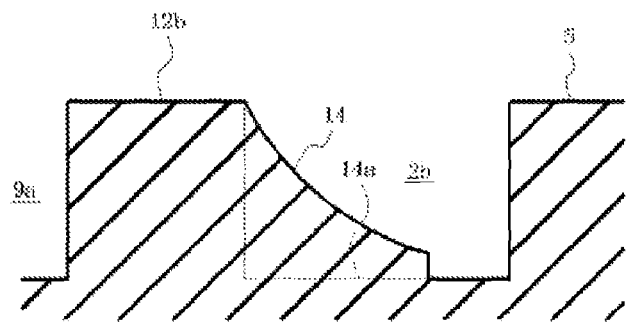
FIG. 6 is a sectional view taken along line A-A in FIG. 4.

In the second embodiment of the present invention, in outside the block groups G comprising two polygonal block rows 11 in the tire width direction, side block rows 13a and 13b are formed by arranging a number of the side blocks 12a and 12b in the tire circumferential direction for surrounding the block groups G. Instead of the side block 12a and 12b, it is also possible to arrange the above mentioned polygonal blocks 10, therefore forming 4 or more of the polygonal block rows. Here, the circumferential lengths of the side blocks 12a and 12b in the side block rows 13a and 13b is longer than the circumferential lengths L1 to L3 of the polygonal blocks 10 in the polygonal block groups G. Also, the side blocks 12a (the left side block row in FIG. 4) in one of two side block rows 13a and 13b is larger in length in the tire circumferential direction than the other side block row 13b (the right side block row in FIG. 4). In a similar manner to other blocks, 2 to 6 rows of sipes are formed in each side block 12a and 12b depending on the block rigidity, and the lug grooves 8 are formed between the side blocks 12a and 12b neighboring with each other in the tire circumferential direction. As shown in FIG. 6, the circumferential groove 2b is comprised of a raised bottom portion 14 to reduce the groove depth partly and connect with the side block 12b. And within the raised bottom portion 14, a pocket (groove) 14a is formed extending substantially in the tire width direction.

The effects of the second embodiment of the present invention will be described below. In the pneumatic tire comprising the polygonal block rows formed by arranging the polygonal blocks closely in the tire circumferential direction in the tread portion 1, an optimized block rigidity is secured, the ground-contact property of each polygonal block 10 is improved and each polygonal block is minimized and positioned in a sufficiently dense arrangement, which enables coexistence of the secured block rigidity and significantly increased the pattern edges (the total edge length of all the polygonal blocks 10), thereby improving the on-ice performance conspicuously.

In addition, it is also possible to have two or more different pitch lengths of the polygonal blocks forming the polygonal block rows and realize the ratio between the maximum and minimum pitch lengths within a range of 1:0.80 to 0.9, thereby reducing fluctuation of the block rigidity and the edge amount in the tire circumferential direction to such a small degree that does not affect the on-ice performance.

For these reasons, thanks to the optimized size of each polygonal block and the optimized pitch length of the polygonal blocks, the pneumatic tire according to the second embodiment can improve the on-ice performance considerably, while improving the quietness of the tire, in comparison with a pneumatic tire according to the prior art.

Also, according to the pneumatic tire of the second embodiment, the on-ice performance enhancing effect by the dense arrangement of the polygonal blocks can be secured very well by the block density in the polygonal block group within a range of 0.003 to 0.04 (pieces/mm$^2$).

Moreover, according to the pneumatic tire of the second embodiment, the optimized block rigidity can be secured by the ground-contact area within a range of 50 to 250 mm$^2$ of the polygonal blocks forming the polygonal block rows, thereby realizing the good-gripping force. Also by means of the ground-contact area ranged accordingly, the distance from the central to peripheral areas on the tread of the polygonal blocks 10 is shortened so that the existing water film can be removed effectively from the road surface upon contact by the polygonal blocks 10 with the ground, improving the on-ice performance even further.

Furthermore according to the pneumatic tire of the second embodiment, in the polygonal block rows 11 neighboring with each other in the tire width direction, the polygonal blocks are arranged with a zigzag pattern by turns, namely the polygonal blocks neighboring with each other in the tire width direction are staggered each other in the tire circumferential direction so that the grounding timing between the polygonal blocks neighboring with each other in the tire width direction can be shifted so as to distribute the noise energy, thus improving the quietness of the tire even further.

Moreover, according to the pneumatic tire of the second embodiment, due to the second grooves extending in the tire circumferential direction and forming the polygonal blocks, and also due to the circumferential grooves deeper than the first grooves, both in the tread portion, it is possible to discharge water to the outside of the ground-contact surface positively for improving the on-ice performance further and the hydroplaning resistance.

In addition, according to the pneumatic tire of the second embodiment, by providing the raised bottom portion 14 in the circumferential groove 2b and forming the pocket 14a extending substantially in the tire width direction within the raised bottom portion 14, the on-snow performance can be improved.

The present invention has been explained above with reference to the embodiments shown in the drawings, though the present invention is not limited to the above mentioned embodiments. For instance, it is also possible to apply both the first and second embodiments of the present invention together. In this instance, the pneumatic tire comprises a plurality of polygonal blocks formed by the grooves in the tread of polygons and having no less than five sides in the tread portion. Two or more polygonal block rows are provided in the tread portion by arranging the polygonal blocks at intervals in the tire circumferential direction and the polygonal blocks in the polygonal block rows neighboring with each other in the tire width direction are arranged with a zigzag pattern, in which the polygonal block of one polygonal block row is positioned between the polygonal blocks of the other polygonal block row in the tire circumferential direction, and the polygonal blocks of one and the other polygonal block rows overlap partly as seen from both the tire circumferential and width directions, thereby forming the block groups by arranging the polygonal blocks closely in the tread portion. The polygonal blocks are formed by the grooves including the first grooves between the polygonal blocks neighboring with each other in the tire circumferential direction, the first grooves being larger in width than the second grooves between the polygonal blocks neighboring with each other with a zigzag pattern. At least one polygonal block row is comprised of more than two different pitch lengths of the polygonal blocks forming the polygonal blocks rows and the ratio between the maximum and minimum pitch lengths is within a range of 1:0.8 to 0.9. The above mentioned block arrangement makes is possible to improve the on-ice performance, while enhancing the on-snow performance and the quietness of the tire further.

Example 1

In order to confirm the effects of the first embodiment of the present invention, the following test tires were prepared for each evaluation in terms of the on-ice and on-snow performances:

pneumatic tire of the first embodiment (Embodiment Tire 1);

pneumatic tires for comparison (Comparative Tires 1 and 2); and pneumatic tire according to the prior art (Prior Art Tire 1). Each tire is a radial ply tire for a passenger vehicle with a tire size of 205/55R16.

The Embodiment Tire 1 has a tread portion 1 with the tread pattern shown in FIG. 1. The groove widths of the circumferential groove 2a, 2b and 2c are 7.5 mm, 18 mm and 4 mm, respectively, and each groove dept is 8.9 mm. In addition, the groove width W9a of the first grooves of the grooves 9 forming the polygonal blocks 10 is wider than the groove width W9b of the second grooves 9b.

The Comparative Tire 1 is different from the Embodiment Tire 1 in that the groove widths W9a and W9b are almost the same regarding the first and second grooves 9a and 9b of the grooves 9 forming the polygonal blocks 10.

The Comparative Tire 2 is different from the Embodiment Tire 1 in that the groove width W9a of the first grooves 9a of the grooves 9 forming the polygonal blocks 10 is smaller than the groove width W9b.

Figure 3:
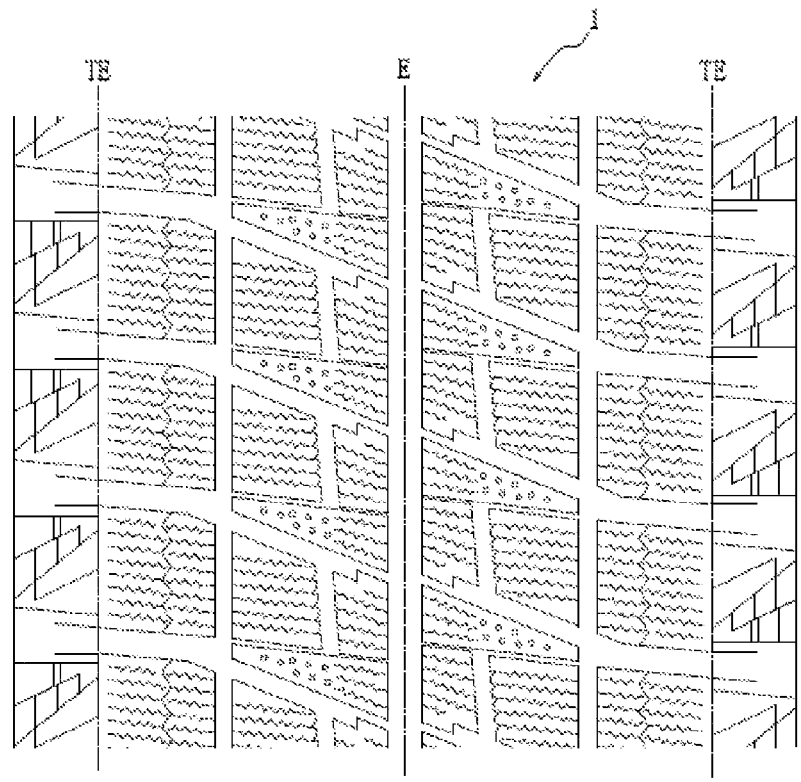
FIG. 3 is an exploded view showing the tread pattern of a conventional pneumatic tire (Prior Art Tire 1).

The Prior Art Tire 1 has a tread portion 1 with a tread pattern shown in FIG. 3. Particulars of the Embodiment Tire 1, the Comparative Tires 1 and 2 and the Prior Art Tire 1 are shown in Table 1. In addition, the Embodiment Tire 1e, the Comparative Tires 1 and 2 and the Prior Art Tire 1 have almost the same negative ratio across the whole tread, respectively.

TABLE 1

|  |  | Embodiment Tire 1 | Comparative Tire 1 | Comparative Tire 2 |
|---|---|---|---|---|
| Tread pattern |  | FIG. 1 | Omitted | Omitted |
| Dimension of polygonal blocks (C: circumferential W: width-wise) | C-length L10 (mm) | 13.2 | 15.6 | 16.4 |
|  | W-length W10 (mm) | 16.4 | 16.4 | 13.2 |
|  | Height (mm) | 7 | 7 | 7 |
| Negative ratio N (%) within the group of polygonal blocks |  | 26 | 23 | 26 |
| Width W (mm) of the group of the polygonal blocks |  | 42 | 42 | 42 |
| Reference pitch length PL of the blocks (mm) |  | 17 | 17 | 17 |
| The number "a" (pieces) of the polygonal blocks within the reference area Z |  | 3.3 | 3.3 | 3.3 |
| Block density D (pieces/mm$^2$) |  | 0.005 | 0.005 | 0.005 |
| Groove width W9a (mm) of the first grooves forming the polygonal blocks |  | 3.2 | 1.6 | 1.6 |
| Groove width W9b (mm) of the second grooves forming the polygonal blocks |  | 1.6 | 1.6 | 3.2 |

Each tire shown above was installed to a standard rim in the size of 16×6.8 J, inflated as inner pressure of 200 kPa (relative pressure) and then mounted on a vehicle for the following evaluations of each performance.

(1) On-Ice Braking Evaluation

The on-ice braking performance was evaluated by a measured distance in fully braking at running with 20 km/h on a freezing road surface. Table 2 shows the evaluation results of the Embodiment Tire 1, the Comparative Tires 1 and 2 as parameters based on index 100 of the Prior Art Tire 1 results, and the larger the number is, the better the on-ice braking performance is.

(2) On-Ice Traction Performance Evaluation

The on-ice traction performance was evaluated by a measured time till reaching 20-m-long distance at accelerating fully on a freezing road surface. Table 2 showed the evaluation results of the Embodiment Tire 1, the Comparative Tires 1 and 2 as parameters based on 100 of the Prior Art Tire 1 results, and the larger the number was, the better the on-ice traction performance was.

(3) On-Snow Braking Performance Evaluation

The on-snow braking performance was evaluated by a measured braking distance in fully braking at running with 40 km/h on a compacted snowy road surface at a test course. Table 2 showed the evaluation results of the Embodiment Tire 1, the Comparative Tires 1 and 2 as parameters based on 100 of the Prior Art Tire 1 results, and the larger the number was, the better the on-snow braking performance was.

(4) On-Snow Traction Performance Evaluation

The on-snow traction performance was evaluated by a measured interval time in accelerating form first 10 km/h to 45 km/h on a compacted snowy road surface at a test course. Table 2 shows the evaluation results of the Embodiment Tire 1, the Comparative Tires 1 and 2 as parameters based on index 100 of the Prior Art Tire 1, and the larger the value is, the better the on-snow traction performance is.

(5) Accelerating HP (Hydroplaning) (Instrumental) Performance Evaluation

The accelerating HP performance was evaluated by measuring the vehicle running speed and the tire rotating speed in accelerating on a wet road surface. The speed was regarded as the hydroplaning outbreak speed, at which the tire rotating speed was increased (namely, a tire rim speed became higher than a running speed due to a slipping tire in the driving side). Table 2 shows the evaluation results of the Embodiment Tire 1, the Comparative Tires 1 and 2 as parameters based on 100 of the Prior Art Tire 1 results, and the larger the number was, the less hydroplaning broke out.

TABLE 2

|  |  | Prior Art Tire 1 | Embodiment Tire 1 | Comparative Tire 1 | Comparative Tire 2 |
|---|---|---|---|---|---|
| On-Ice Performance | Braking | 100 | 109 | 109 | 105 |
|  | Traction | 100 | 109 | 106 | 105 |
| On-Snow Performance | Braking | 100 | 100 | 100 | 102 |
|  | Traction | 100 | 102 | 97 | 100 |
| Accelerating HP Performance |  | 100 | 100 | 102 | 100 |

Based on the results shown in Table 2, the Embodiment Tire 1 is superior in the on-ice and on-snow performances in comparison with the Prior Art Tire 1 and the Comparative Tires 1 and 2, while realizing the same accelerating HP performance as before.

Example 2

In order to confirm the effects of the second embodiment of the invention, the following test tires were prepared for each evaluation in terms of the on-ice performance and the quietness of the tire:

pneumatic tires of the second embodiment (Embodiment Tire 2 to 4);

pneumatic tires in comparison (Comparative Tires 3 to 5); and pneumatic tire according to the Prior Art Tire (Prior Art Tire 2).

Each test tire is a radial ply tire for a passenger vehicle in the size of 195/65R15

In the tread portion 1, the Embodiment Tire 2 tire has a tread pattern shown in FIG. 4, with four mutually different pitch lengths in each polygonal block row under the condition that the maximum and minimum pitch length ratio was; 1:0.8.

In the tread portion 1, the Embodiment Tire 3 tire has a tread pattern shown in FIG. 4, with four mutually different pitch lengths in each polygonal block row under the condition that the maximum and minimum pitch length ratio is 1:0.9.

The Embodiment Tire 4 tire has a tread portion 1 of a tread pattern shown in FIG. 4, with four mutually different pitch lengths in each polygonal block row under the condition that the maximum and minimum pitch length ratio is 1:0.85.

The Comparative Tire 3 is different from the Embodiment Tire 2 in that each polygonal block row is arranged in only one pitch, namely the maximum and minimum pitch length ratio is 1:1.

The Comparative Tire 4 is different form the Embodiment Tire 2 in that the maximum and minimum pitch length ratio is 1:0.7.

The Comparative Tire 5 is different form the Embodiment Tire 2 in that the maximum and minimum pitch length ratio is 1:0.95.

Figure 7:
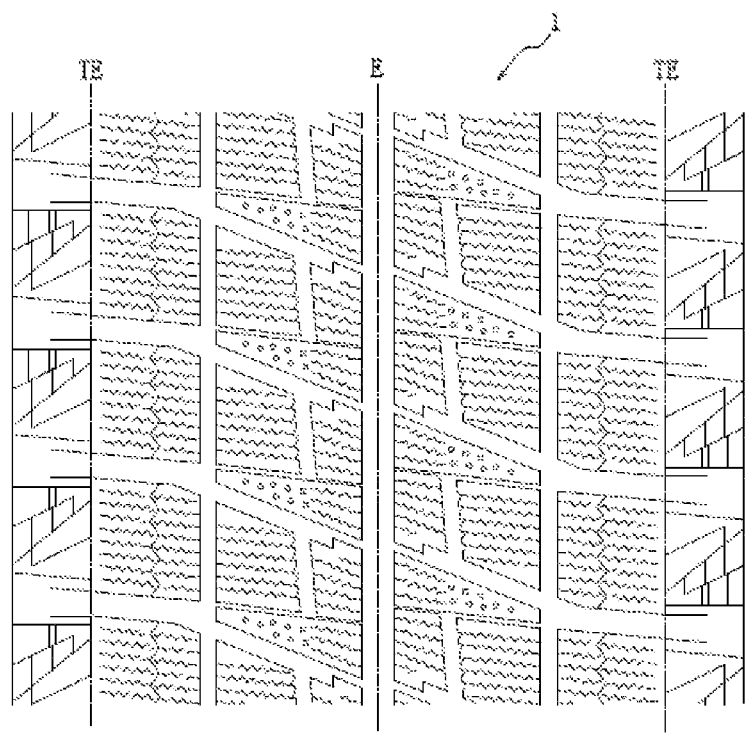
FIG. 7 is an exploded view showing the tread pattern of a conventional pneumatic tire (Prior Art Tire 2) according to the prior art.

The Prior Art Tire 2 has a tread portion 1 with a tread pattern shown in FIG. 7. Particulars of the Embodiment Tires 2 to 4 and the Comparative Tires 3 to 5 are shown in Table 3. In addition, the Embodiment Tires 2 to 4, the Comparative Tires 3 to 5 and the Prior Art Tire 2 have almost the same negative ratio across the whole tread respectively.

TABLE 3

|  |  |  | Embodiment Tire 2 | Embodiment Tire 3 | Embodiment Tire 4 | Comparative Tire 3 | Comparative Tire 4 | Comparative Tire 5 |
|---|---|---|---|---|---|---|---|---|
| Dimension of polygonal blocks | Circumferential length L10 (mm) | Max | 19.9 | 18.8 | 19.4 | 17.8 | 21.3 | 18.2 |
|  |  | Min | 15.9 | 16.9 | 16.5 | 17.8 | 14.9 | 17.4 |
|  | Widthwise length W10 (mm) | Max | 16.4 | 16.4 | 16.4 | 16.4 | 16.4 | 16.4 |
|  |  | Min | 16.4 | 16.4 | 16.4 | 16.4 | 16.4 | 16.4 |
|  | Height (mm) |  | 6.7 | 6.7 | 6.7 | 6.7 | 6.7 | 6.7 |
| Circumferential length (mm) of first groove |  | Max | 4.0 | 3.6 | 3.8 | 3.2 | 4.6 | 3.4 |
|  |  | Min | 3.2 | 3.2 | 3.2 | 3.2 | 3.2 | 3.2 |
| Pitch length Max : Min in polygonal block rows |  |  | 0.8:1 | 0.9:1 | 0.85:1 | 1:1 | 0.7:1 | 0.95:1 |
| Block density D (piece/mm$^2$) |  |  | 0.005 | 0.005 | 0.005 | 0.005 | 0.005 | 0.005 |

Each tire shown above was installed to a rim in the size of 15×6 J, inflated as inner pressure of 240 kPa (relative pressure) and then mounted on a vehicle for the following evaluations of each performance.

(1) On-Ice Braking Evaluation

The on-ice braking performance was evaluated by measuring the distance in fully braking while running at 20 km/h on a freezing road surface. Table 4 shows the evaluation results of the Embodiment Tire 2 to 4 and the Comparative Tires 3 to 5 tires as parameters based on index 100 of the Prior Art Tire 2 results, and the larger the number is, the better the on-ice braking performance is.

(2) Tire Quietness Evaluation

A sensory evaluation in terms of the tire quietness was conducted by fixing each tire at a vehicle with an engine displacement of 2000 cc. Table 4 shows the evaluation results of the Embodiment Tire 2 to 4 and the Comparative Tires 4 and 5 as parameters based on index 100 of the Comparative Tire 3 results, and the larger the value is, the better the tire quietness is improved.

TABLE 4

|  | Prior Art Tire 2 | Embodiment Tire 2 | Embodiment Tire 3 | Embodiment Tire 4 | Comparative Tire 3 | Comparative Tire 4 | Comparative Tire 5 |
|---|---|---|---|---|---|---|---|
| On-ice Performance | 100 (Standard) | 107 | 111 | 109 | 113 | 105 | 112 |
| Quietness of the tire | — | 120 | 110 | 120 | 100 (Standard) | 105 | 101 |

Based on the results shown in Table 4, the Embodiment Tire 2 to 4 were superior significantly in the on-ice performance in comparison with the Prior Art Tire 2, and the Embodiment Tire 2 to 4 were also improved in the tire quietness comparing with the Comparative Tires 3 and 5. In the Comparative Tire 4 tire, improvement of the tire quietness could be confirmed but the on-ice performance was not improved sufficiently.

INDUSTRIAL APPLICABILITY

It will be appreciated from the foregoing description that, by applying the present invention, the on-ice performance can be improved simultaneously with a variety of other performances. In particular, by means of the optimized arrangement of the polygonal blocks, the present invention makes it possible to highly effectively realize both the on-ice and on-snow performances simultaneously. Also, by adjusting both the size of each polygonal block and the lengths the polygonal block pitches, the on-ice performance can be improved even further than before, while improving the quietness of the tire effectively.

REFERENCE SYMBOLS

1 Tread portion
2a, 2b, 2c Circumferential groove
3 Shoulder block
4 Shoulder block row
5 Rectangular block
6 Rectangular block row
7 Sipe
8 Lug groove
9 Groove
9a First groove (transverse groove)
9b Second groove (longitudinal groove)
10 Polygonal block (Octagonal block)
11 Polygonal block row
12a, 12b Side block
13a, 13b Side block row
14 Raised bottom portion
14a Pocket
G Block group
P1, P2, P3 Pitch length

The invention claimed is:
1. A pneumatic tire comprising a plurality of polygonal blocks formed by grooves in a tread of polygons and having no less than five sides in a tread portion, wherein:
two or more polygonal block rows are provided in the tread portion by arranging the polygonal blocks at intervals in a tire circumferential direction and the polygonal blocks in polygonal block rows neighboring with each other in a tire width direction are arranged with a zigzag pattern so that the polygonal block of one polygonal block row is positioned between the polygonal blocks of the other polygonal block row in the tire circumferential direction, and the polygonal blocks of one and the other polygonal block row overlap partly as seen from both the tire circumferential and width directions, thereby forming polygonal block groups by arranging the polygonal blocks closely in the tread portion;
the polygonal blocks are formed by grooves, including first grooves between the polygonal blocks neighboring with each other in the tire circumferential direction, and second grooves between the polygonal blocks neighboring with each other with a zigzag pattern, the first grooves being larger in width than second grooves, the polygonal blocks in the polygonal block groups have a ground-contact area within a range of 50 to 230 mm$^2$; and at least one polygonal block row comprises more than two different pitch lengths of the polygonal blocks forming the polygonal block rows and a ratio between maximum and minimum pitch lengths is within a range of 1:0.8 to 0.9.

2. A pneumatic tire according to claim 1, wherein the block groups have a block density, defined by a number of the polygonal blocks per unit area of actual ground-contact, the block density being within a range of 0.003 to 0.04 pieces/mm$^2$.

3. A pneumatic tire according to claim 1, wherein, among the grooves forming the polygonal blocks in the polygonal block groups, the first grooves between the polygonal blocks neighboring with each other in the tire circumferential direction have a groove width within a range of 2.5 to 10.0 mm, and the second grooves between the polygonal blocks with a zigzag pattern have a width within a range of 0.4 to 3.0 mm.

4. A pneumatic tire according claim 1, wherein the tread portion is provided with circumferential grooves extending in the tire circumferential direction and the grooves forming the polygonal blocks in the polygonal block groups are smaller in depth than the circumferential grooves.

* * * * *